United States Patent [19]

Smithline et al.

[11] Patent Number: 5,787,447
[45] Date of Patent: Jul. 28, 1998

[54] MEMORY ALLOCATION MAINTAINING ORDERING ACROSS MULTIPLE HEAPS

[75] Inventors: Neil G. Smithline, San Jose; Christopher D. Quenelle, Mountain View, both of Calif.

[73] Assignee: Sun Microsystems, Inc., Palo Alto, Calif.

[21] Appl. No.: 436,101

[22] Filed: May 8, 1995

[51] Int. Cl.$^6$ .................................................. G06F 17/30
[52] U.S. Cl. ........................................ 707/206; 364/281.1
[58] Field of Search ............................. 395/375, 497.01, 395/480, 183.11, 575, 650, 400, 708, 707, 710; 364/200, 281.1; 707/206

[56] References Cited

U.S. PATENT DOCUMENTS

| | | | |
|---|---|---|---|
| 4,757,438 | 7/1988 | Thatte et al. | 364/200 |
| 4,920,483 | 4/1990 | Pogue et al. | 364/200 |
| 4,989,134 | 1/1991 | Shaw et al. | 707/206 |
| 5,088,036 | 2/1992 | Ellis et al. | 707/206 |
| 5,182,806 | 1/1993 | McKeeman et al. | 395/707 |
| 5,222,221 | 6/1993 | Houri et al. | 395/375 |
| 5,301,288 | 4/1994 | Newman et al. | 395/400 |
| 5,321,834 | 6/1994 | Weiser et al. | 707/206 |
| 5,325,531 | 6/1994 | McKeman et al. | 395/708 |
| 5,355,483 | 10/1994 | Serlet | 395/650 |
| 5,408,650 | 4/1995 | Arsenault | 395/575 |
| 5,519,866 | 5/1996 | Lawrence et al. | 395/710 |
| 5,535,329 | 7/1996 | Hastings | 395/183.11 |
| 5,560,003 | 9/1996 | Nilsen et al. | 395/600 |
| 5,561,786 | 10/1996 | Morse | 395/497.01 |
| 5,566,321 | 10/1996 | Pase et al. | 395/480 |

FOREIGN PATENT DOCUMENTS

WO 94/02898   2/1994   WIPO.

OTHER PUBLICATIONS

Imai et al. "Evaluation of Parallel Copying Garbage Collection on a Shared-Memory Multiprocessor", IEEE Transactions on Parallel and Distributed Systems, v4, n9, pp. 1030–1040, Sep. 1993.

Grehan, Rick "If Memory Serves...", Byte, p. 279(4), Aug. 1989.

Grehan, Rick "Virtually Virtual Memory", Byte pp. 455–464, Sep. 1990.

Bott, Ed "Windows Invisible Wall: The 64k Barrier", Windows, p. 210(1), Mar. 1994.

Appleby et al. "Garage Collection for Prolog Based on WAM", Communications of the ACM (1988–1992), v31, n6, Jun. 6, 1988.

Harbaugh et al. "HeapGuard, Eliminating Garbage Collection in Real–Time Ada Systems", National Aerospace and Electronic, 1991 Conf. (NAECON), p. 704(4), 1991.

Kuechlin et al. "On Multi-Threaded List–Processing and Garbage Collection", Parallel and Distributed Processing, 1991 Proceedings, p. 894(3), 1991.

Shaw, Richard Hale "An Introduction to Wins32 API", PC Magazine, Apr. 26, 1994, v13, n8, p.291(5).

Berkovich, Simon Y., "Organization of Associative Memory Operations with Lattice Structures", Circuits and Systems, 1992 IEEE Midwest Symposium, p. 887(3).

*Primary Examiner*—Thomas G. Black
*Assistant Examiner*—Charles L. Rones
*Attorney, Agent, or Firm*—Graham & James LLP

[57] ABSTRACT

A method and apparatus for adding and deleting data in a plurality of heaps stored in memory, where the ordering of the data in the heaps is maintained across the heaps as the additions and deletions are performed. Not all entries in the heaps have a corresponding entry in all of the other heaps, but the ordering of the data in the heaps is in accordance with an order dependent list stored in memory. Such ordered heaps are useful for example, in a incremental linker software program.

19 Claims, 14 Drawing Sheets

MEMORY ALLOCATION MAINTAINING ORDERING ACROSS MULTIPLE HEAPS

BACKGROUND OF THE INVENTION

This invention relates to memory management in a data processing system and, more specifically, to adding and deleting data in a plurality of heaps, where the ordering of the data is maintained across the heaps.

Various types of software programs store information in memory in the form of "heaps". A heap is a collection of data. Heaps can be implemented as arrays, as linked lists, or as any other appropriate data structure known to persons of ordinary skill in the art.

Many conventional software programs create heaps to store data needed by the software program. Usually, an empty heap is created at the beginning of execution of the software program and data is added to the heap as execution of the software program progresses.

A "linker" software program combines one or more "object files" into a single "executable file". Conventional linker software creates a plurality of lists during its execution, where each list contains a certain type of data from the object files being linked. The linker takes the segments from each object file, in input order, and appends them to the end of each appropriate list. Each time a new re-link is performed, a conventional linker creates a completely new executable file. The creation of completely new executable files is inefficient because only some of the object files will have been modified since the last time the linking operation was performed.

SUMMARY OF THE INVENTION

The present invention provides a method and apparatus for maintaining ordering across a plurality of heaps when data are deleted from and added to the heaps. In certain applications, it is desirable to maintain the ordering of the heaps as data is deleted and added. A "segment" is a block of data in a heap.

Each segment on a heap has associated with it zero or one other related segments on each of the other heaps. The ordering constraint ensures that if, on one heap, segment [i] precedes segment [i+1], then on all heaps that contain segments associated with segment [i] and segment [i+1], the segment associated with segment [i] will proceed the segment associated with segment [i+1].

It is often desirable that a plurality of related data segments must be inserted into respective ones of the plurality of heaps. The requirement that data in the heaps remain ordered means that a data segment can be inserted, in the middle of one heap only if there is also room to insert the other related data segments into a corresponding location in each of the other heaps.

The present invention is described hereby in terms of heaps in an incremental linker software program. It will be understood by persons in ordinary skill in the art, however, that the present invention also may have applicability in other areas where maintaining ordering across heaps is valuable. The present invention uses the concept of "significant segment" to manipulate a plurality of pointers associated with ones of the plurality of heaps so that ordering is maintained across the heaps as data is added to and removed from the heaps.

In accordance with the purpose of the present invention, as broadly described hereby, the present invention is an apparatus for manipulating entries in a plurality of heaps stored in a memory of a data processing system, comprising: means for determining respective amounts of required free space in each of the plurality of heaps and means for allocating the respective amounts of required free space in each of the plurality of heaps, so that the entries in the heaps remain ordered across the heaps.

In further accordance with the purpose of the invention, as broadly described herein, the invention is a method for finding a predetermined amount of free space in each of a plurality of heaps stored in a memory of a data processing system, the method comprising: the steps, performed by the data processing system, of: establishing a hi pointer and a lo pointer for each of the plurality of heaps, so that each heap has an associated lo pointer and an associated hi pointer; advancing at least one of the lo pointers to be equal to its corresponding hi pointer; advancing the corresponding at least one hi pointer to point to a next significant segment for the at least one hi pointer in the plurality of heaps; and determining whether the predetermined amount of free space exists in each of the heaps between each associated lo pointer and associated hi pointer.

In further accordance with the purpose of the present invention, as broadly described herein, the invention is an article of manufacture, comprising: a computer readable program means for receiving a plurality of predetermined values indicating a respective amount of space to be allocated in each of a plurality of heaps; and a computer readable program means for determining respective locations in the plurality of heaps having each respective amount of space; and a computer readable program means for allocating the respective locations, wherein the allocated locations maintain an ordering across the plurality of heaps.

Advantages of the present invention will become more fully apparent when the following detailed descriptions of the invention are read in conjunction with the accompanying drawings.

BRIEF DESCRIPTION OF THE DRAWINGS

The invention will now be described with reference to the accompanying drawings, wherein.

DETAILED DESCRIPTION OF THE PREFERRED EMBODIMENTS

The following description is of the best presently contemplated mode of carrying out the invention. This description is made for the purpose of illustrating the general principles of the invention and is not to be taken in a limiting sense.

Figure 1:
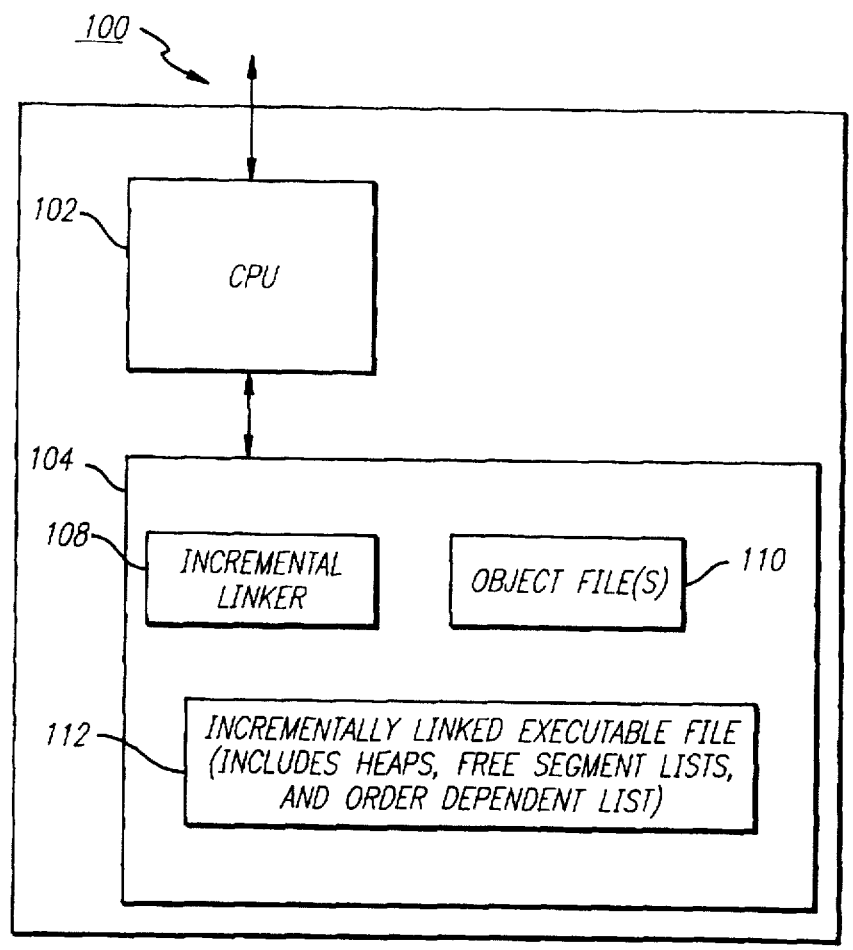
FIG. 1 is a block diagram of a data processing system in accordance with a preferred embodiment of the present invention.

FIG. 1 shows a data processing system 100, including a CPU 102 and a memory 104 connected to CPU 102. It will be understood by persons of ordinary skill in the art that data processing system 100 may also include various input/output devices, peripherals, network connections, memories, CPUs, etc., which are not shown in the figure for the sake of clarity.

Memory 104 includes an incremental linker software program 108, which preferably is an incremental linker running under the UNIX™ operating system. "UNIX" is a registered trademark in the United States and other countries exclusively licensed through X/OPEN, LTD. SUN MICROSYSTEMS, INC. manufactures a version of UNIX called SOLARIS, which is a registered trademark of SUN MICROSYSTEMS, INC." Memory 104 also includes one or more object files 110 and one or more incrementally linked executable files 112. An incrementally linked executable file 112 further includes various data structures, such as heaps, free segment lists, and an order dependent list, which are discussed below in more detail.

Figure 2A:
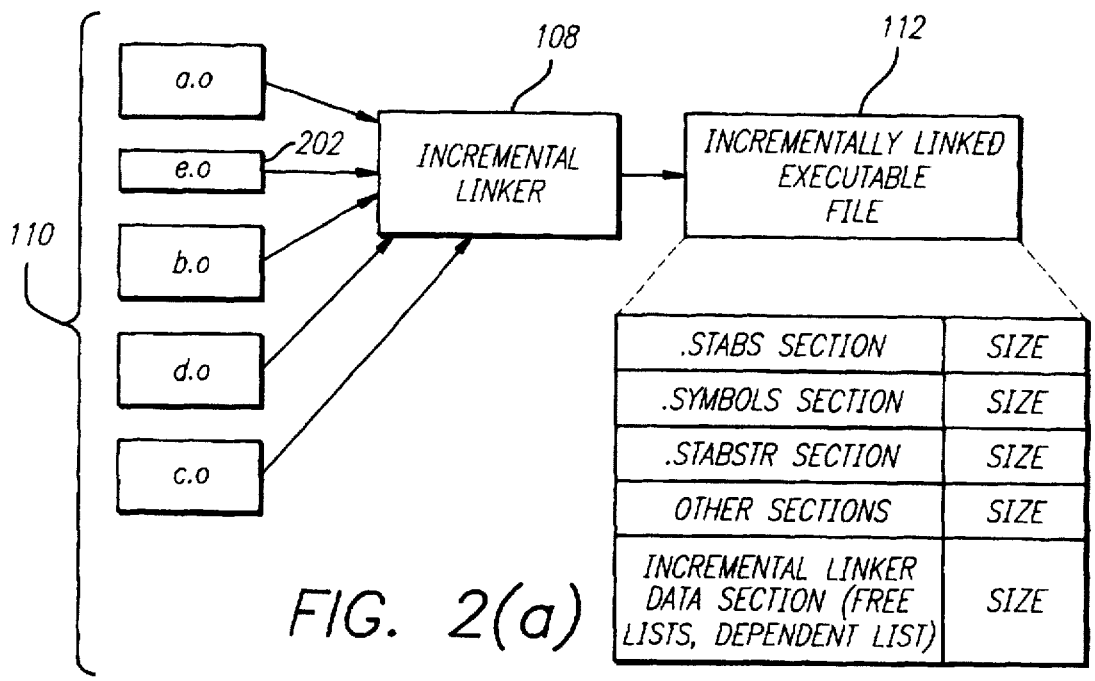
FIGS. 2(a), 2(b), and 2(c) are block diagrams showing input to and output from an incremental linker software program.
Figure 2B:
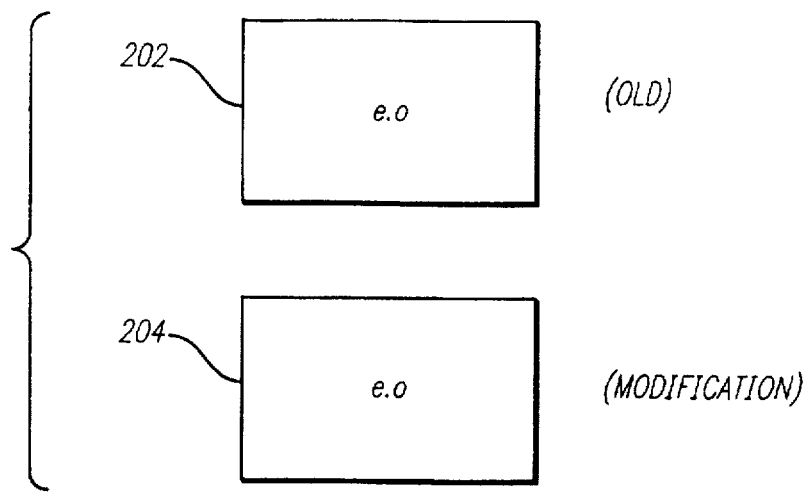
Figure 2C:
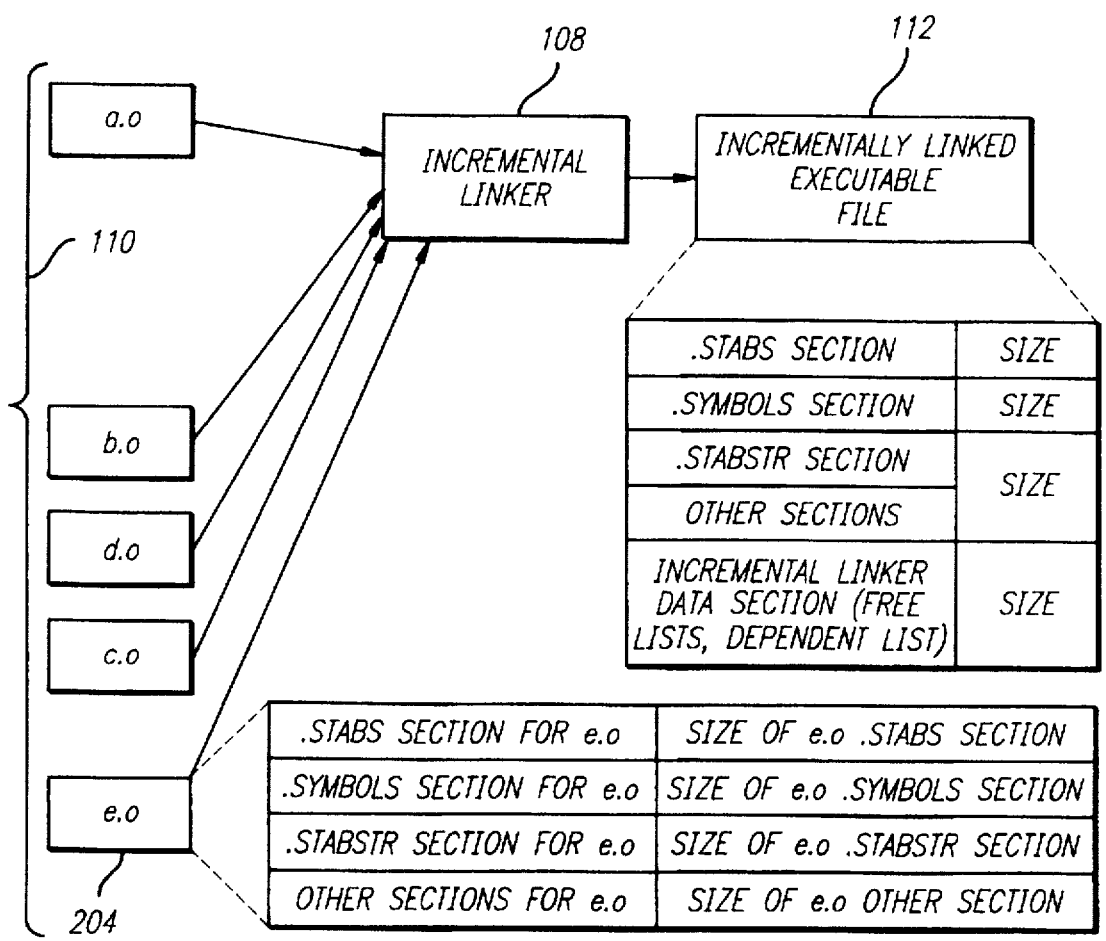

As shown in FIGS. 2(a)–2(c), object files 110 are input to incremental linker 108, which modifies executable file 112. Incremental linker 108 differs from a conventional linker because it does not relink every object file 110 each time linkage between object files is performed. Incremental linker 108 saves all of its old data from previous link operations in executable file 112 and generates new data only for those object files that have been modified since a previous link operation. The format of files 110 and 112 input to and output from incremental linker 108 is known to persons of ordinary skill in the art and is discussed in more detail in "System V Application Binary Interface," Prentice-Hall, Copyright 1990 by AT&T™ and "System V Application Binary Interface—SPARC Processor Supplement," Prentice-Hall, Copyright 1990 by AT&T™, which are hereby incorporated by reference.

In a preferred embodiment, where the present invention is used in incremental linker 108, each heap in executable file 112 and each segment in each object file corresponds to an ELF (Executable and Linking Format) section. In general, each object file 110 has a plurality of ELF sections (along with a size of each ELF section.) These are merged during linking (along with previous file 112) to form the ELF sections of incrementally linked file 112 (see FIG. 2(c)).

FIG. 2(a) is a block diagram showing input and output of incremental linker 108. As show in the figure, incremental linker 108 has as initial inputs object files a.o, e.o, b.o, d.o, and c.o. FIG. 2(b) further shows that a first version of the object file e.o 202 is modified to yield a newer version of the object file e.o 204. As shown in FIG. 2(c), after e.o is modified, the object files are relinked. During relinking, all data for e.o 202 will be deleted from executable file 112 and new data for e.o 204 will be added to executable file 112.

Figure 3:
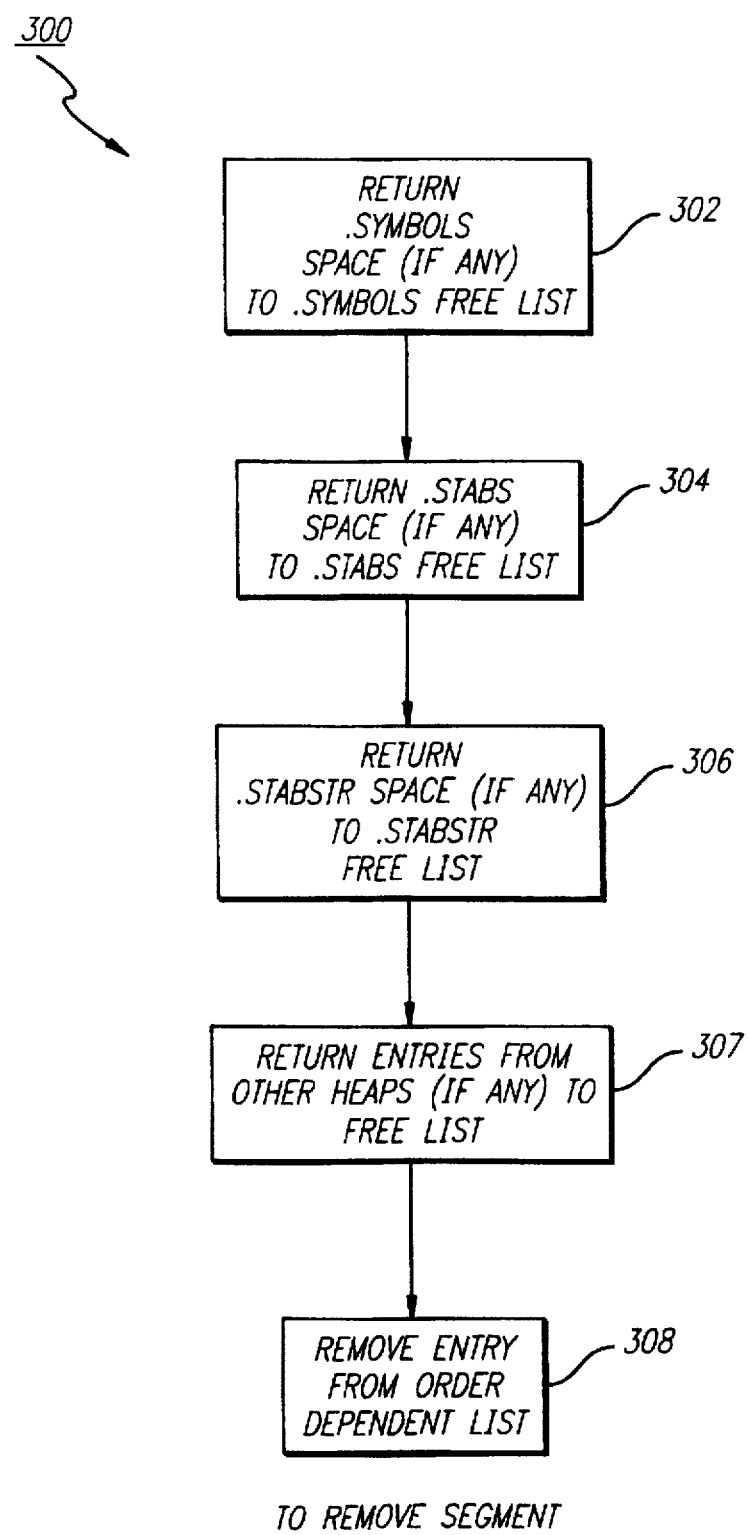
FIG. 3 is a flow chart showing steps performed to remove a plurality of segments from a plurality of heaps.
Figure 4:
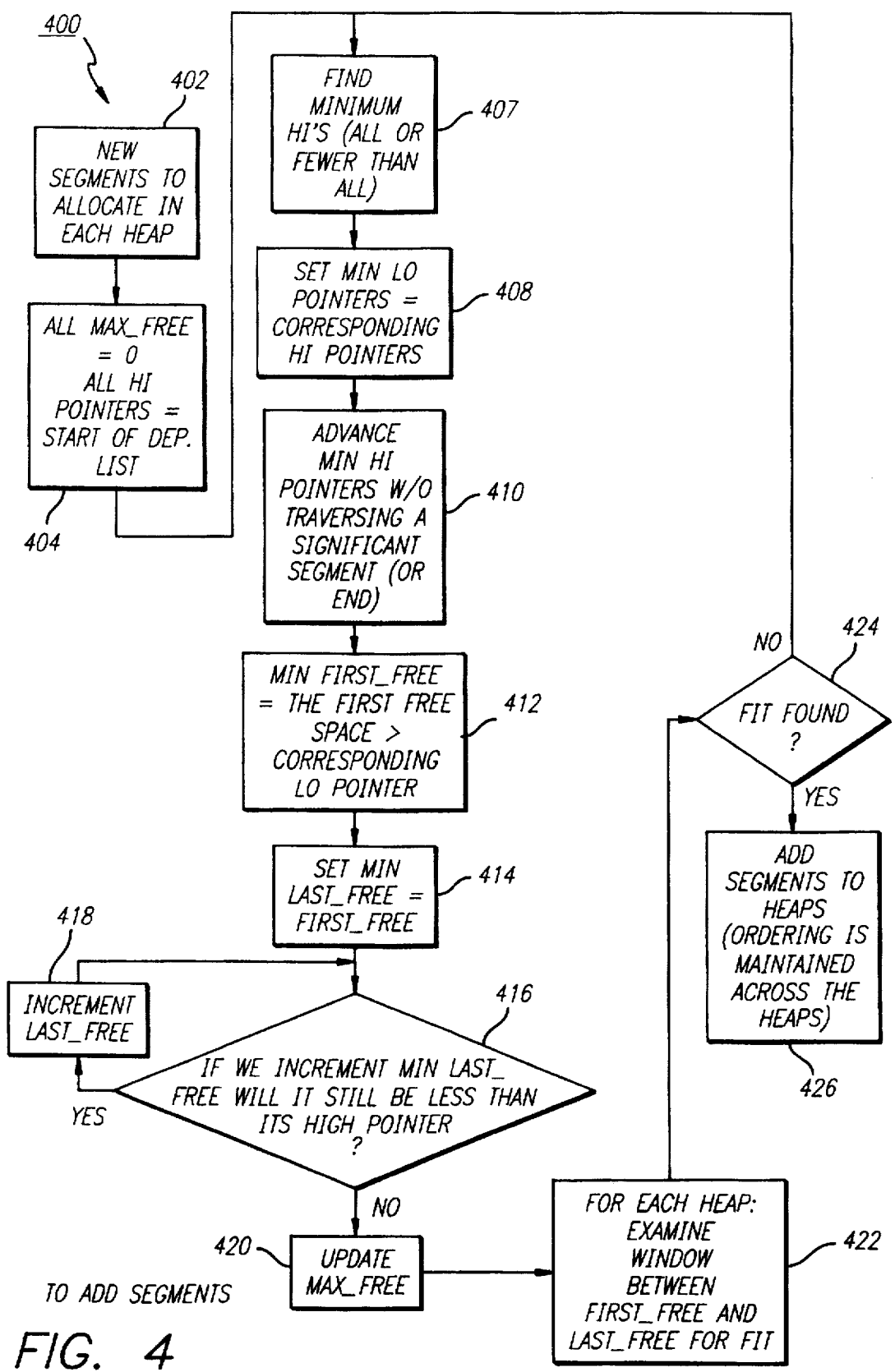
FIG. 4 is a flow chart showing steps performed to add a plurality of segments to the plurality of heaps, while maintaining the ordering of the data across the corresponding heaps.

FIG. 3 is a flow chart showing steps performed to delete segments corresponding to object file e.o 202 from a plurality of heaps in memory 104. FIG. 4 is a flow chart showing steps performed to add segments corresponding to object file e.o 204 to the plurality of heaps in memory 104. Both FIGS. 3 and 4 will be discussed below in detail in connection with the examples of FIGS. 5–14. It will be understood by persons of ordinary skill in the art that the steps in FIGS. 3 and 4 are performed by CPU 102 executing instructions of incremental linker program 108 and using data structures stored in memory 104.

Figure 5:
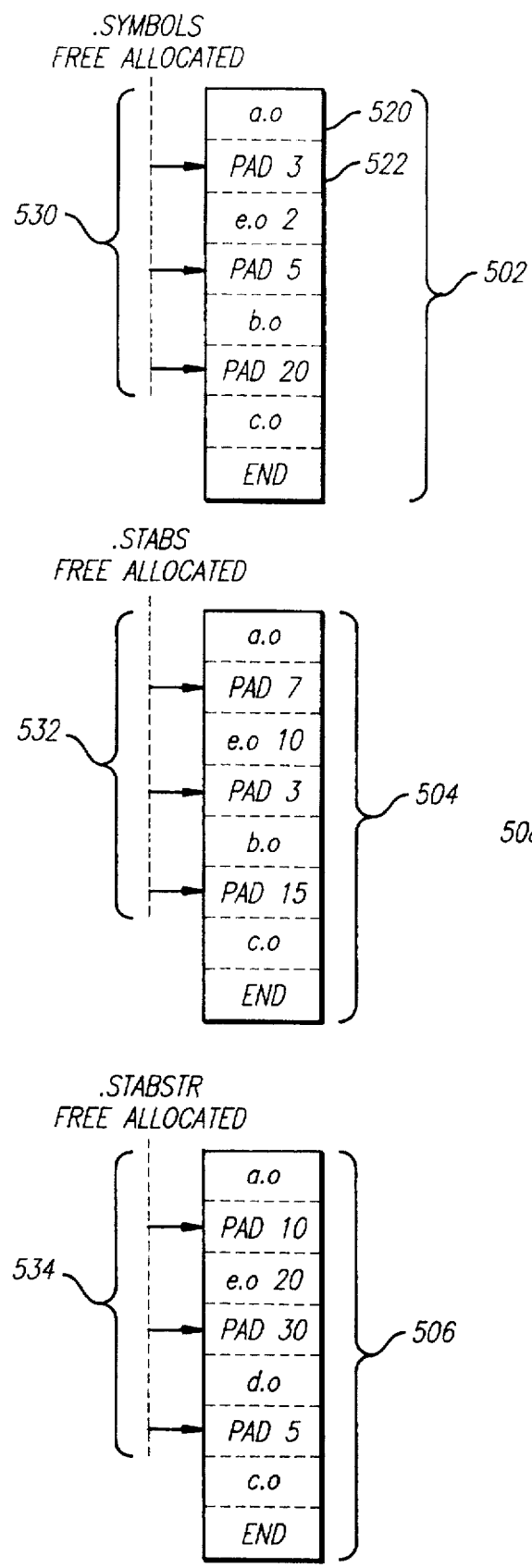
FIG. 5 is an initial state of a data structure in a computer memory of FIG. 1 after a plurality of segments have been added to the plurality of heaps.
Figure 5:
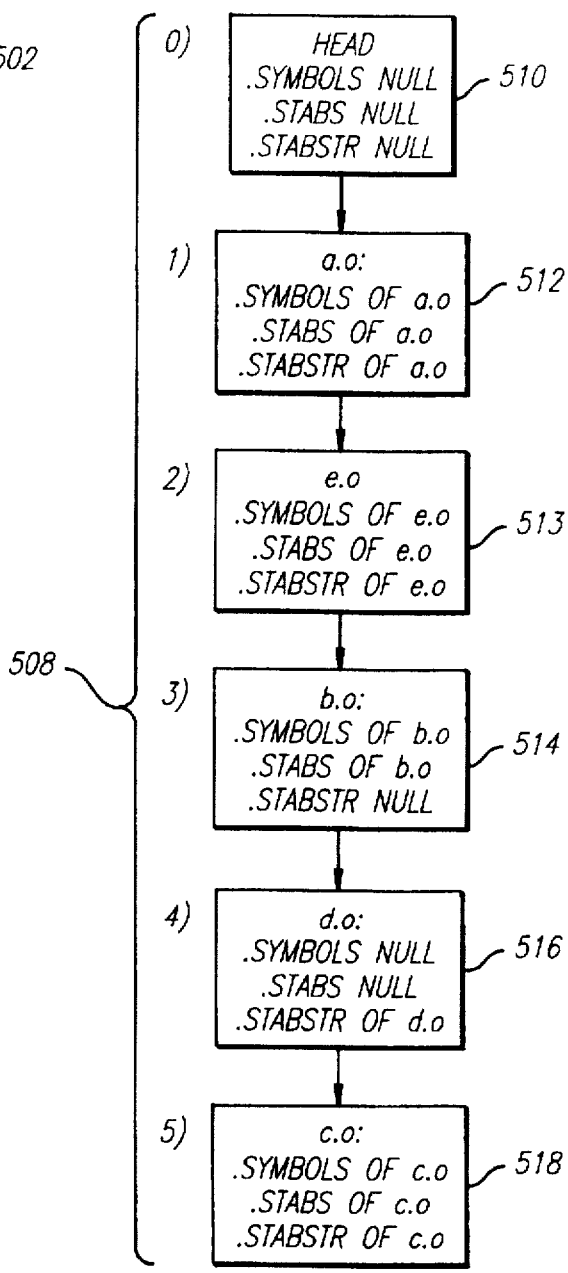
Figure 6:
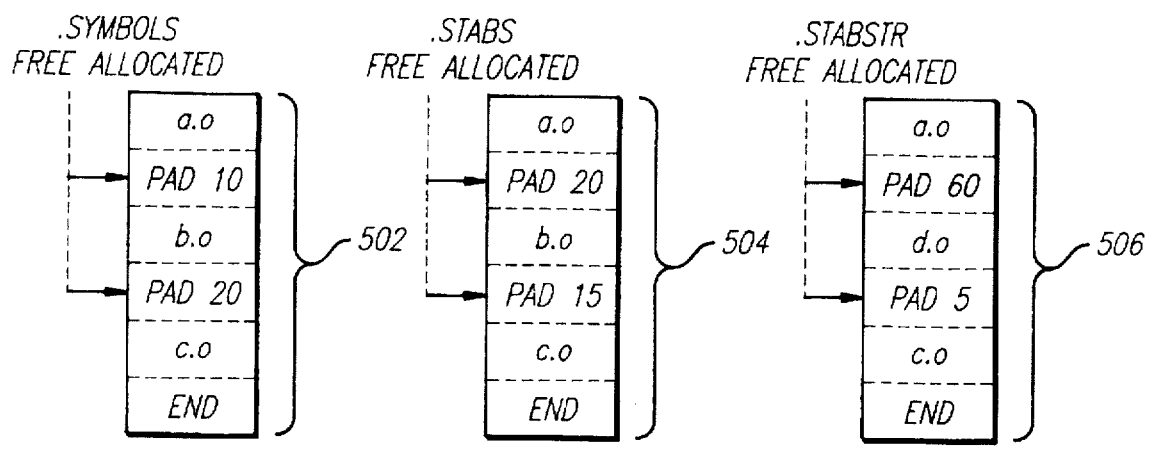
FIG. 6 is an example of the data structure of FIG. 5 after deletion of segments from the plurality of heaps.
Figure 6:
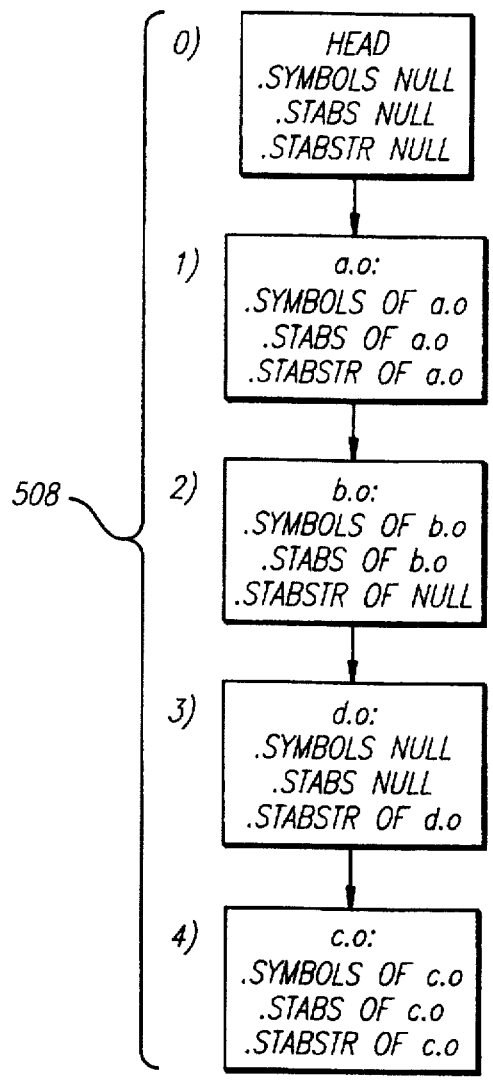

The following paragraphs discuss the examples of FIGS. 5–14 in conjunction with the flow charts of FIGS. 3 and 4. FIG. 5 shows three heaps 502, 504, and 506. It will be understood by persons of ordinary skill in the art that the present invention will work with an arbitrary number of heaps.) FIGS. 5 and 6 show an example of deleting segments of object file e.o 202 from the plurality of heaps. FIGS. 6–14 show an example of adding segments of object file e.o 204 to the plurality of heaps, while maintaining the ordering of segments in the heaps.

In the example, heap 502 corresponds to a symbol (.symbols) section for the object files a.o, e.o, b.o, and c.o. Similarly, heap 504 corresponds to a debugging information section (.stabs) for object files a.o, e.o, b.o, and c.o. Lastly, heap 506 corresponds to a debugging information string table section (.stabstr) for object files a.o, e.o, d.o, and c.o. Entries in each heap (ELF section) are called "segments." It should be noted that there is no segment for object file d.o in either heap 502 or heap 504. Similarly, there is no segment for object file b.o in heap 506. In spite of the fact that the heaps do not contain data for the same object files, the segments in each of the heaps are ordered in accordance with an order dependent list 508.

As shown in FIG. 5, order dependent list 508 contains five entries: a first entry 510, which acts as the head of the list; an entry 512 for object file a.o, which contains pointers into heaps 502, 504, and 506; an entry 513 for object file e.o, which contains pointers into heaps 502, 504, and 506; an entry 514 for object file b.o, which contains pointers into heaps 502 and 504, but does not contain a pointer into heap 506; an entry 516 for object file d.o, which contains only a pointer into heap 506; and an entry 518 for object file c.o, which contains pointers to each of heaps 502, 504, and 506. Thus, FIG. 5 represents data structures in incremental linker 108 after linkage of object files a.o, e.o (a first version 202), b.o, d.o and c.o.

Each heap 502, 504, and 506 contains a plurality of segments, e.g., segment 520, which preferably are separated by one or more free bytes of padding, e.g., padding 522. In FIG. 5, a number following the word "pad" represents a number of bytes of a padding area. The padding areas in each heap are connected in a linked list called a "free list" 530, 532, and 534. FIG. 5 also shows a number of bytes in the segments for e.o 202 (i.e., "2", "10", and "20") in each heap. In a preferred implementation of the present invention, the allocated segments in each heap are also connected in a linked list, although this is not necessary and other implementation may use other appropriate data structures to represent the heaps, free lists and order dependent list. The linked list of allocated segments is not shown in the figures in order to enhance the clarity of the example.

FIG. 3 is a flow chart showing steps performed to delete segments corresponding to object file e.o 202 from the plurality of heaps. In the example, segments corresponding to object file e.o 202 are removed, so that a new version of e.o 204 may be added (see FIGS. 4 and 6–14). First, in step 302, CPU 102 locates the entry 513 for object file e.o 202 in order dependent list 508 and accesses pointers into each of heaps 502, 504 and 506. (Some of these pointers could be NULL.)

In step 302, the space in symbols heap 502 previously reserved for e.o 202 is returned to free list 530. In step 304, the space in stabs heap 504 previously reserved for e.o 202 is returned to the free list 532. In step 306, the space in .stabstr heap 506 previously reserved for e.o 202 is returned to free list 534. In step 307, the space in any other heaps (not shown) previously reserved for e.o 202 is returned to corresponding free lists. (It will be understood by persons of ordinary skill in the art that steps 302–307 may be implemented as a loop). Lastly, in step 308, the entry 513 for e.o 202 in order dependent list 508 is removed from list 508. FIG. 6 shows an example of the heaps and order dependent list after the segments of file e.o 202 have been removed. Note that in FIG. 6, (in heap 502) "pad 3", the space reserved for the symbols of e.o, and the space reserved for "pad 5" have been combined to form "pad 10". Similar changes have made to heaps 504 and 506. Furthermore, entry 513 for e.o has been deleted from order dependent list 508.

FIG. 4 shows steps performed by CPU 102 to add segments for the new version of e.o 204 into the already existing heaps.

As shown in the example FIGS. 7–14, each heap has five associated variables, which are stored in memory 104. They are:

lo: points to the segment in order dependent list 508 at the beginning of a range of free space, hi: points to the segment in order dependent list 508 at the end of the range of free space, first_free: points to the first free segment in a heap that has an address that is greater than lo but still less than hi, last_free: points to the last free segment in a heap that has an address that is greater than lo but still less than hi, and max_free: the greatest size of any free block in the range $first_{13}$ free through last_free.

In the example of FIGS. 6–14, the lo and hi variables are distinguished by prefixing the variable name with the heap name. For example, the lo and hi pointers of the stabs heap 502 will be shown in the diagram as "stabs:lo" and "stabs:hi", respectively. In the figures, first_free and last_free are abbreviated "ff" and "lf", respectively.

In step 402, CPU 102 inputs the sizes of the new segments to be allocated in each heap. As shown in FIGS. 2(a)–2(c), the segment sizes are a part of the object file 204.

Figure 7:
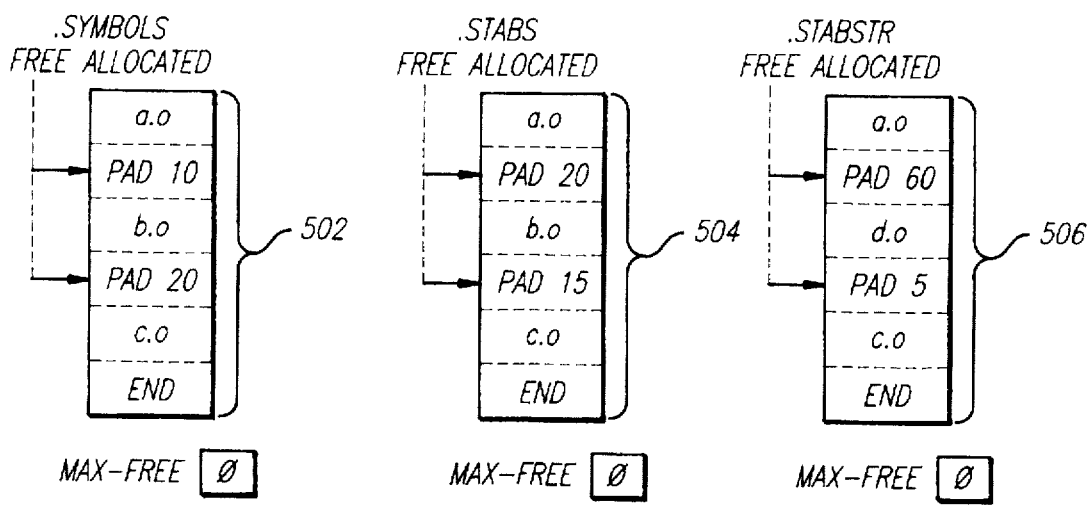
FIG. 7 is an example of the data structure of FIG. 6 showing addition of segments to the plurality of heaps.
Figure 7:
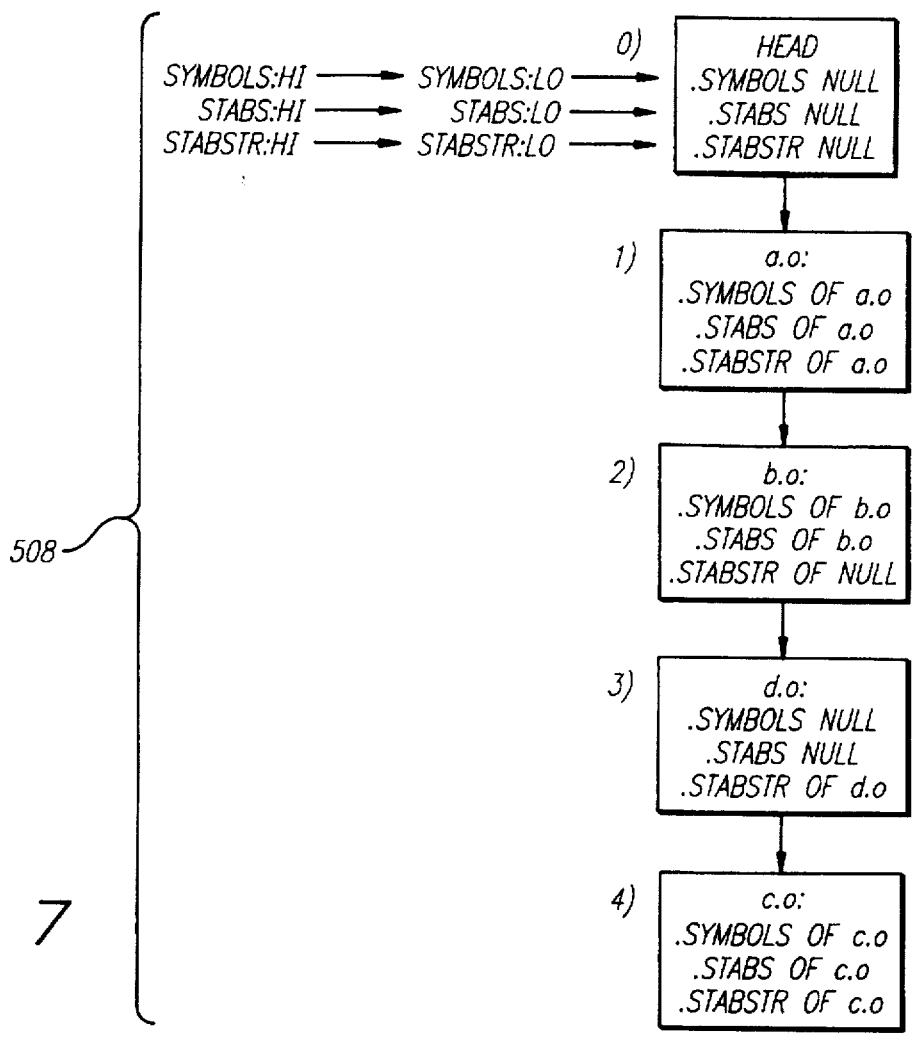

The example of FIGS. 6–14 shows allocations of segments for a new file e.o 204 that has a symbols segment of 15 bytes, a stabs segment of 10 bytes, and a .stabstr segment of 30 bytes. In step 404, as shown in FIG. 7, the max_free variable for each heap is set to "0". The hi pointers for each heap are initialized to point to the start of order dependent list 508.

In step 407, a minimum hi pointer is defined as all hi pointers that point to the earliest entry in order dependent list 508. In FIG. 7, all of the hi pointers are members of the minimum hi pointer set because they all point to the same entry of order dependent list 508 (i.e., the beginning of the list). In step 408 all of the lo pointers are set equal to the value of their corresponding hi pointers.

Figure 8:
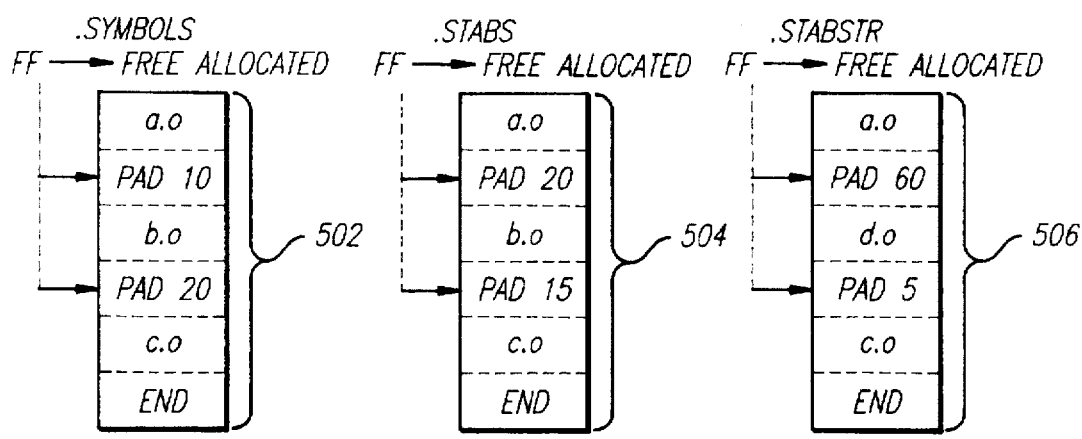
FIG. 8 is a further example of the data structure of FIG. 7 showing addition of the segments to the plurality of heaps.
Figure 8:
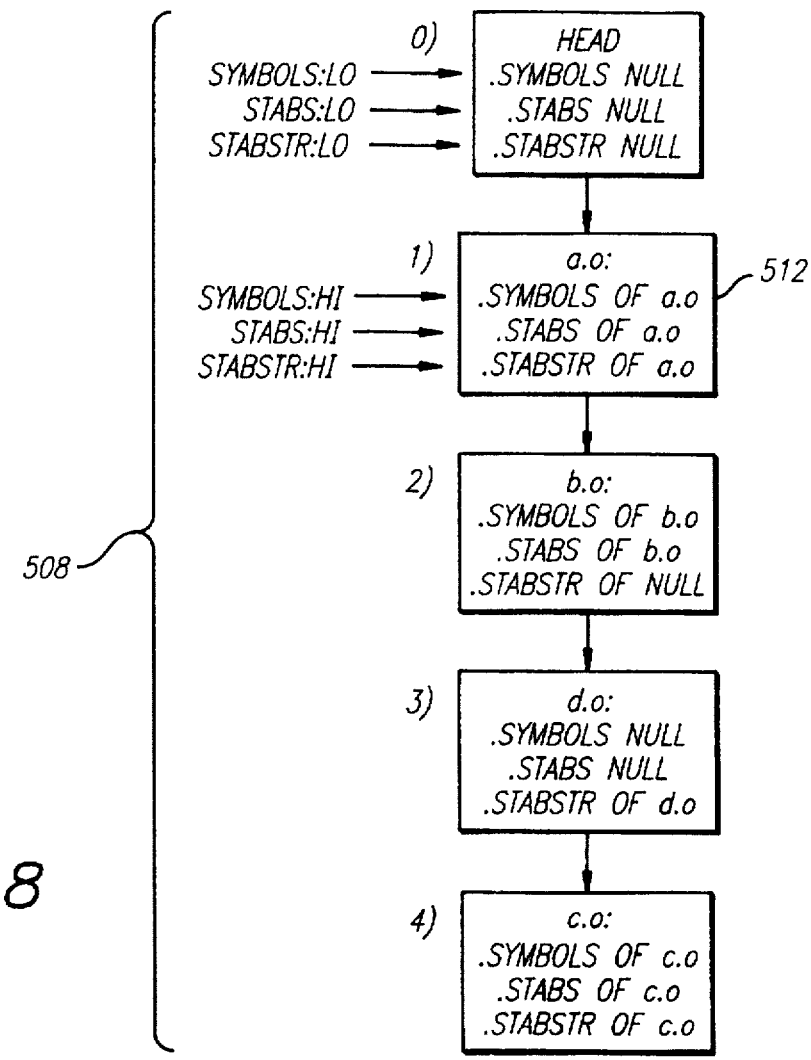

In step 410 (see FIG. 8), CPU 102 advances each of the hi pointers as far as possible without traversing any "significant segments." A significant segment is defined as a segment whose entry in order dependent list 508 contains a non-NULL pointer into the hi pointer's corresponding heap and a non-NULL pointer into at least one other heap for which the segment that is currently being placed also has a non-NULL pointer. Thus, the entry 512 for a.o in order dependent list 508 is a significant segment for each of the three hi pointers. In step 410, as shown in FIG. 8, the hi pointer for each of the three heaps is advanced to the entry for a.o in order dependent list 508. In step 412, as also shown in FIG. 8, each first_free (ff) variable is set to the beginning of the free list for its corresponding heap.

Figure 9:
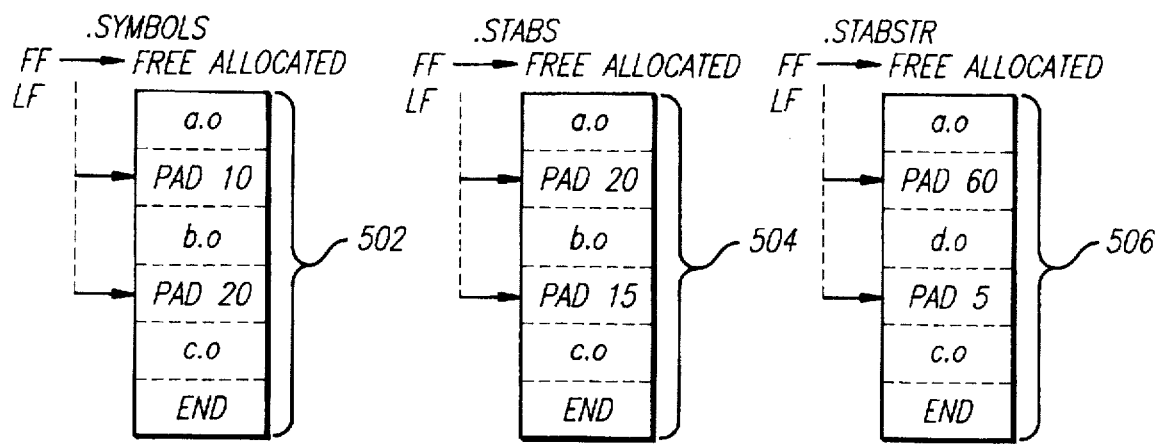
FIG. 9 is a further example of the data structure of FIG. 8 showing addition of the segments to the plurality of heaps.
Figure 9:
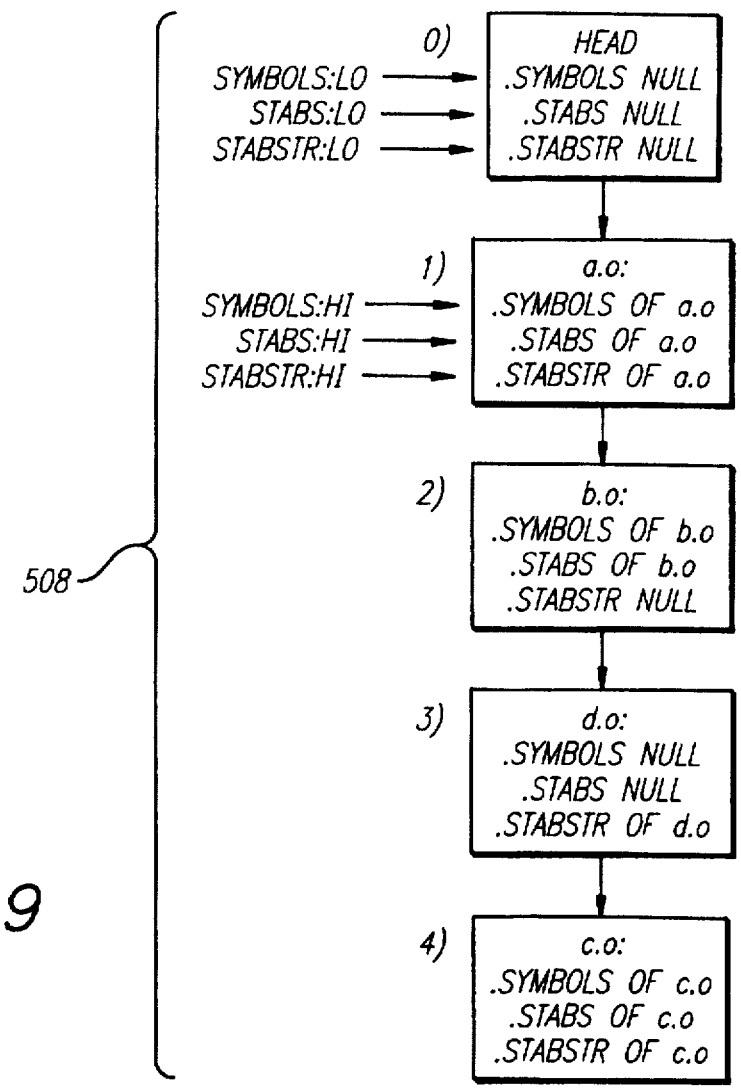
Figure 10:
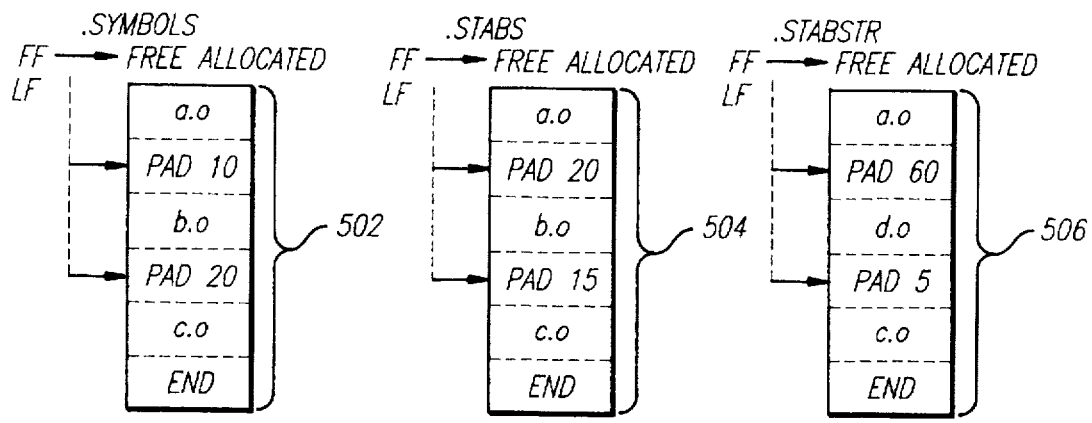
FIG. 10 is a further example of the data structure of FIG. 9 showing addition of the segments to the plurality of heaps.
Figure 10:
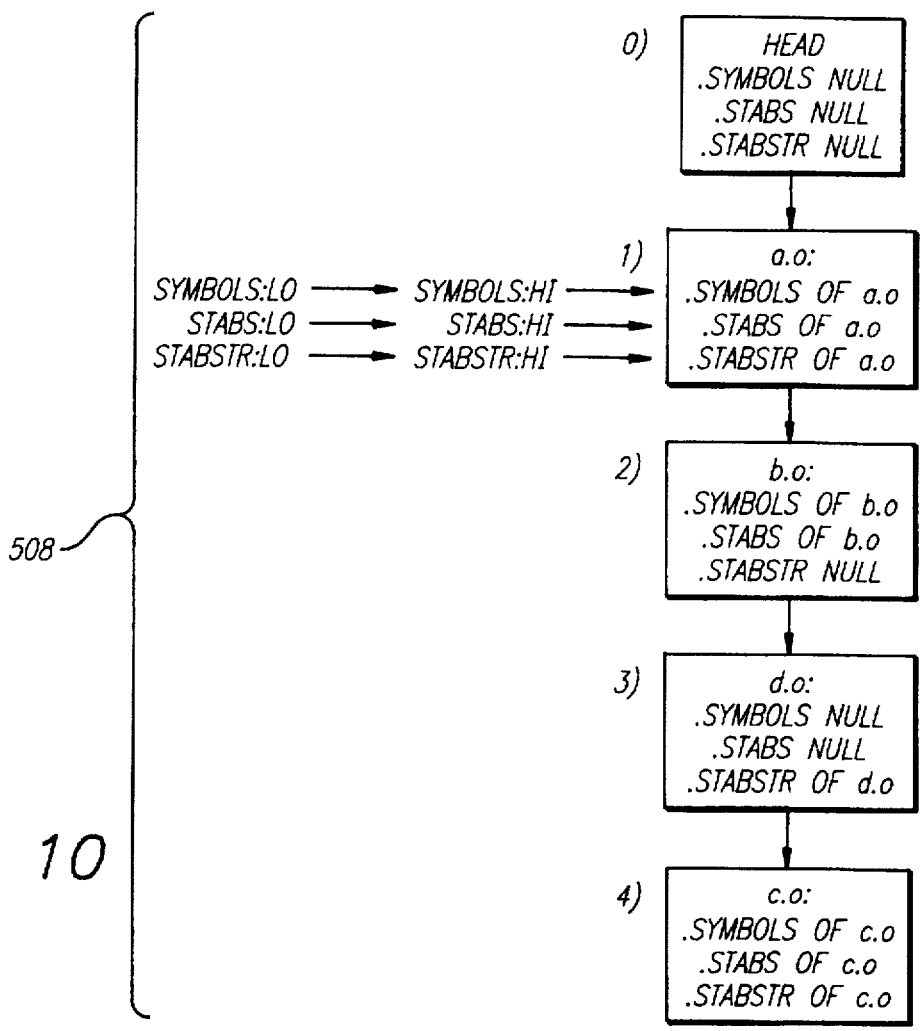

In step 414 (see FIG. 9), each last_free (lf) variable is set to its corresponding first_free variable. In steps 416 and 418, CPU 102 advances each last_free variable down its free list as far as it will go while still keeping the address of the free segment less than the address of its corresponding hi pointer in order dependent list 508. Thus, in the example, none of the last_free variables are advanced, and the last_free variables remain at the beginning of the free list as shown in FIG. 9. Steps 416 and 418 search for a location before the a.o segment (pointed to by the hi pointers) to place the new segment, but since there is no padding before a.o in any of the heaps, no free space is found.

In step 420, CPU 102 updates max_free for each heap (in this case all of the max_free variable still equal "0"). In step 422, CPU 102 examines all free space between first_free and last_free (in this case none) and determines whether there is a fit for the predetermined amount of free space being sought. In the example, no fit is found at step 424, so control returns to step 407.

Repeating step 407 (see FIG. 10), CPU 102 determines which hi pointers need to be updated. Again, all hi pointers need to be updated. In step 408, each lo pointer is set to its corresponding hi pointer and, in step 410 (see FIG. 11), the hi pointers are advanced as far as possible without traversing a significant segment for the pointer.

Figure 11:
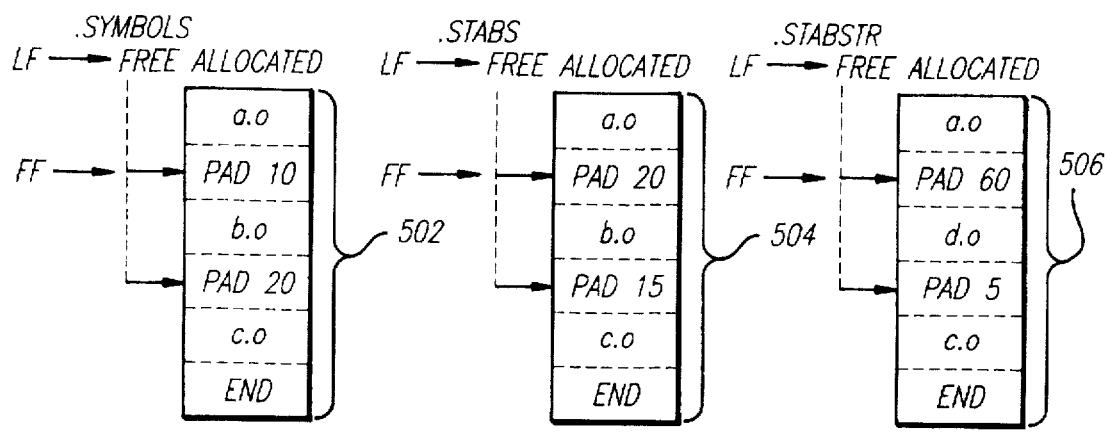
FIG. 11 is a further example of the data structure of FIG. 10 showing addition of the segments to the plurality of heaps.
Figure 11:
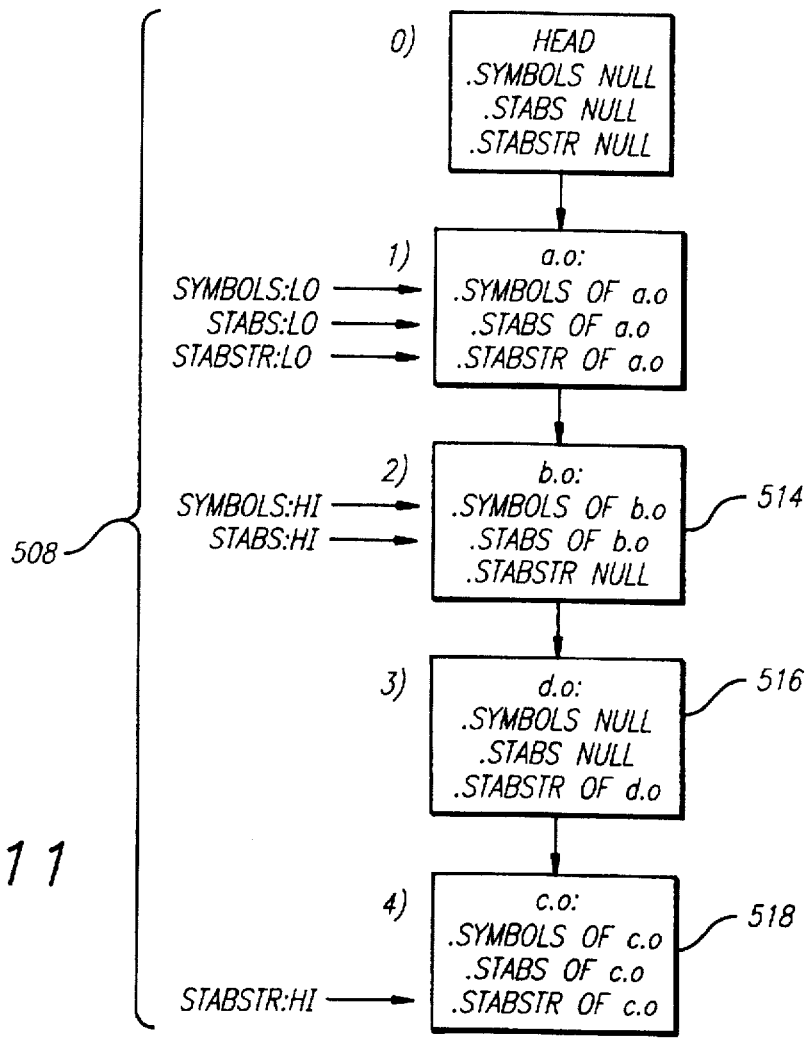

In FIG. 11, the hi pointers for heaps 502 and 504 (symbols:hi and stabs:hi) have been advanced to the entry 514 of order dependent list 508 for file b.o. Entry 514 represents a significant segment for the hi pointer for heap 502 because the entry contains a non-NULL pointer into heap 502 and into at least one other heap (heap 504). Entry 514 represents a significant segment for the hi variable for heap 504 because it contains a non-NULL pointer into heap 504 and into at least one other heap (heap 502).

In FIG. 11 the hi pointer for heap 506 has been advanced to the entry 518 in order dependent list 508 for file c.o. The entry 514 for file b.o in list 508 is not a significant segment because it has a NULL pointer into heap 506. Similarly, the entry 516 for file d.o is not a significant segment for heap 506 because, although it has a non-NULL pointer into heap 506, it does not have a non-NULL pointer into any other heap. The entry 518 for c.o is a significant segment for heap 506 because it has a non-NULL pointer into heap 506 and a non-NULL pointer into at least one other heap (heaps 504 and 506). In step 412 (see FIG. 11), the first_free variables for heaps 502 and 504 are advanced to above the lo pointer for the corresponding heap.

In step 414, (see FIG. 12), each last_free variable is set to its corresponding first_free variable. In steps 416 and 418, each last_free variable is advanced to the highest entry in its free list that is less than the segment referenced by the corresponding hi pointer. Thus, in FIG. 12, the last_free variable for heap 502 remains at "pad 10" (less than b.o), the last_free variable for heap 504 remains at "pad 20" (less than b.o), and the last_free variable for heap 506 points to "pad 5" (less than c.o). In step 420, max_free for heap 502 is updated to "10", max_free for heap 504 is updated to "20" and max_free for heap 506 is updated to "60" (the maximum of 60 and 5).

Figure 12:
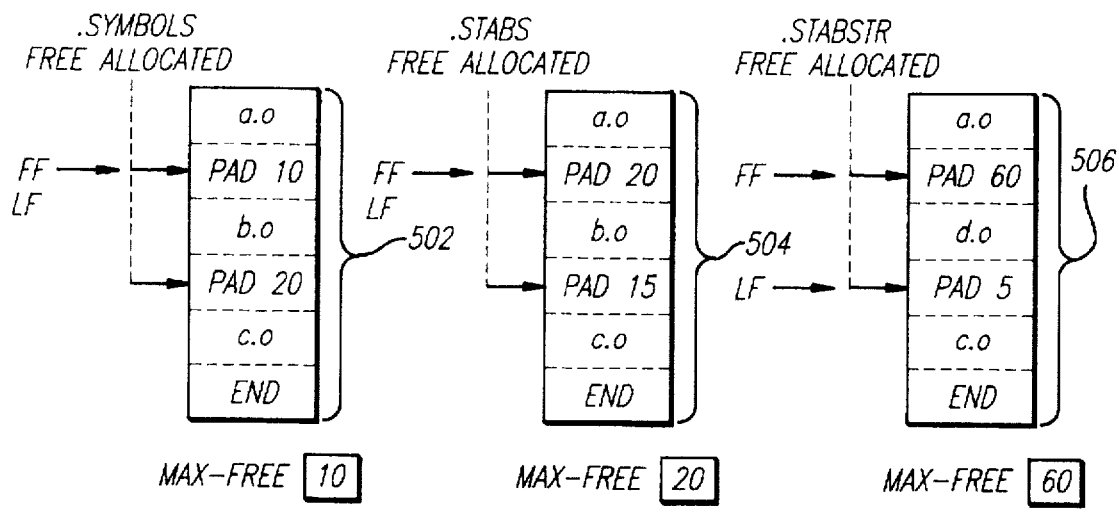
FIG. 12 is a further example of the data structure of FIG. 11 showing addition of the segments to the plurality of heaps.
Figure 12:
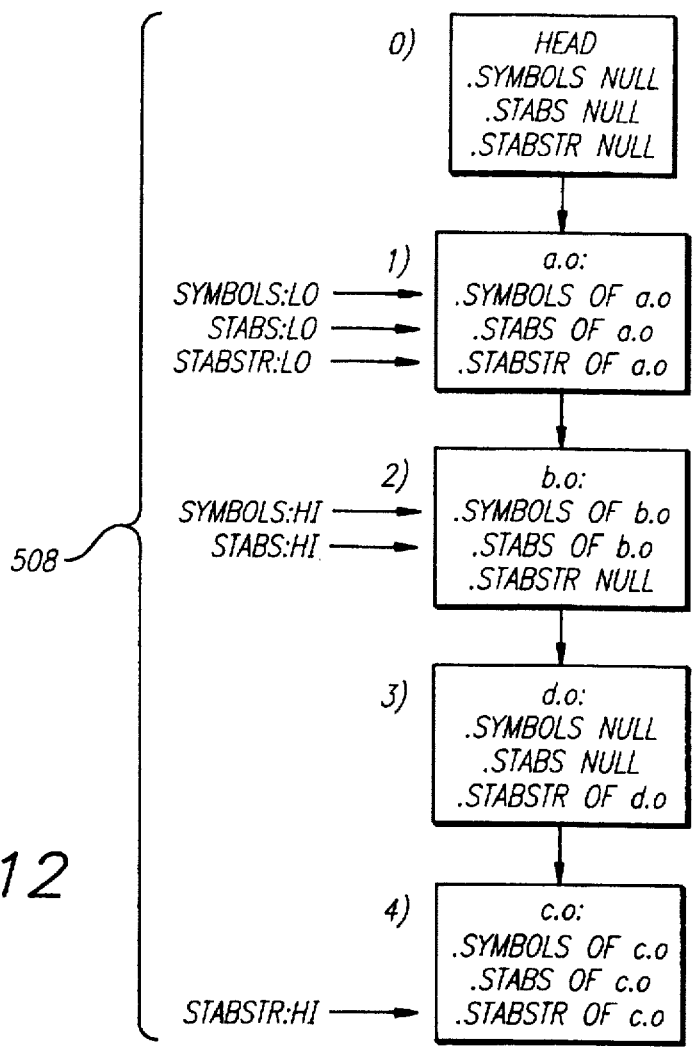
Figure 13:
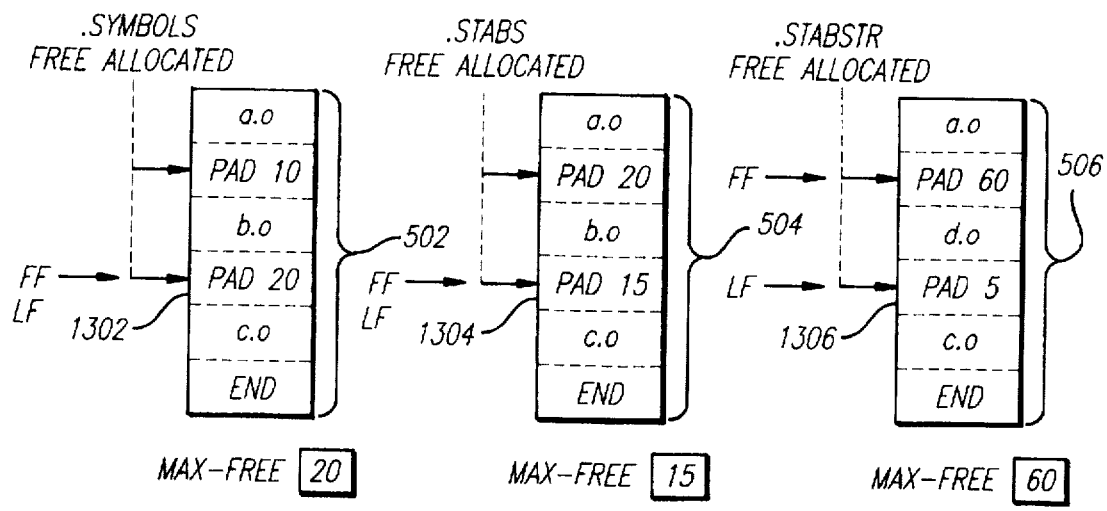
FIG. 13 is a further example of the data structure of FIG. 12 showing addition of the segments to the plurality of heaps.
Figure 13:
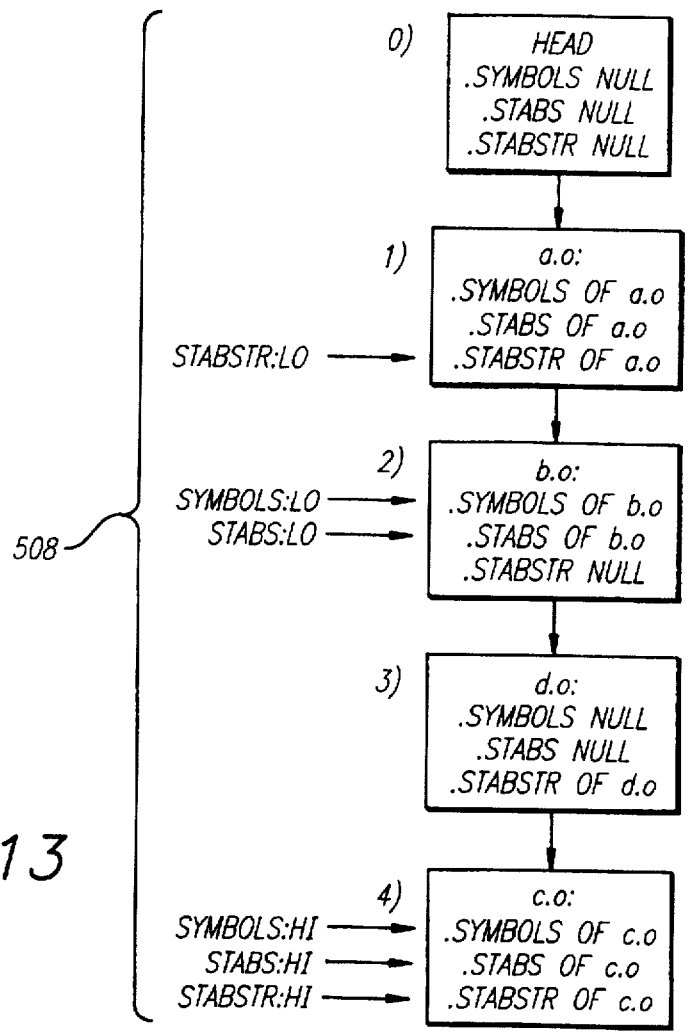

CPU 102 cannot place the segments for file e.o between first_free and last_free in heap 502 in FIG. 12 because the symbols segment for file e.o requires 15 bytes and only 10 bytes are available. Because, in steps 422 and 424, the max_free variables indicate that there is not enough free space in the windows formed by the first_free and last_free variables in each heap, control passes to step 407.

During the third iteration, steps 408–420 are performed only for those variables corresponding to heaps 502 and 504 (see FIG. 12). The variables corresponding to heap 506 remain unaffected. In step 408 (see FIG. 13), the lo pointers for heaps 502 and 504 are set to the value of the hi pointers for those heaps (b.o). In step 410, the first_free variables for heaps 502 and 504 are advanced to above the lo pointer for the corresponding heap. In step 412, the hi pointers for heaps 502 and 504 are advanced to the entry for file c.o, which is a significant segment for both hi pointers. In step 414, the last_free variables are set to the first_free variables. In steps 416 and 418, the last_free variables are incremented so that they are as high as possible while still being less than the hi pointer. In this example, the last_free variables do not change value. In step 420, the max_free variables for heaps 502 and 504 are updated to "20" and "15", respectively.

Following the execution of step 420, the maximum free space in each of respective heaps 502, 504, and 506 are:

symbols: max_free =20 stabs: max_free =15 stabstr: max_free =60 (the greater of 5 and 60).

Figure 14:
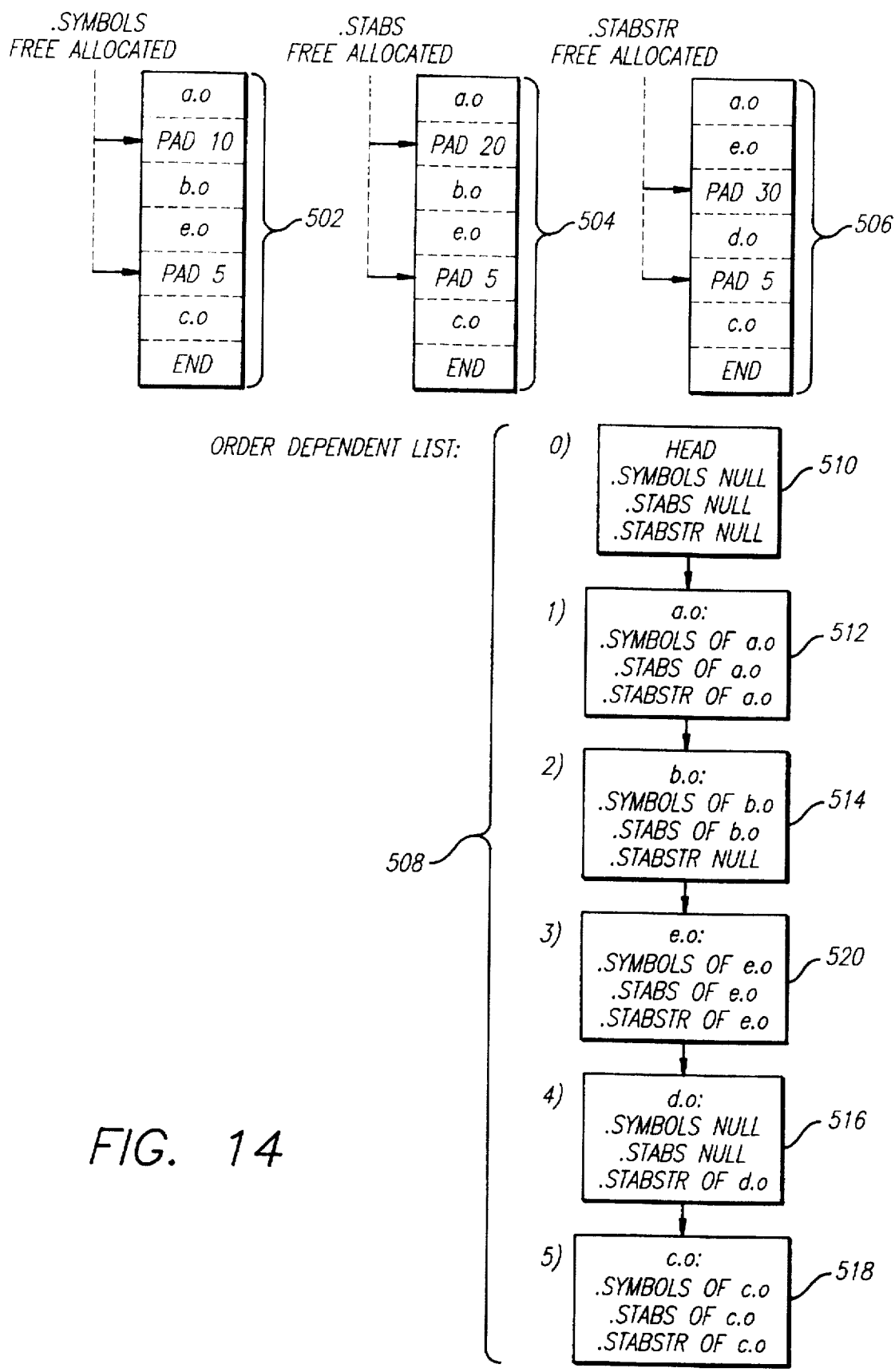
FIG. 14 is a further example of the data structure of FIG. 13 showing addition of the segments to the plurality of heaps.

Thus, since the objective is to find 15 bytes, 10 bytes, and 30 bytes, respectively, in heaps 502, 504, and 506, the determination of steps 422 and 424 is "YES" and the symbols segment, the stabs segment, and the stabstr segment for file e.o 204 are added to their respective heaps in step 426 at the locations 1302, 1304 and 1306. FIG. 14 shows the heaps 502, 504 and 508 after step 426. An entry 520 for object file e.o 204 is added to order dependent list 508. It should be noted that new entry 520 occupies a different location in list 508 than did old entry 513. It should be understood that the steps of FIGS. 3 and 4 are repeated for each modified object file that is relinked by incremental linker 108.

In the embodiment of FIG. 4, CPU 102 chooses a first fit found in steps 422, 424. Other embodiments of the present invention may attempt to find all possible fits and then select an optimal fit. See "Operating System Concepts 2e" by Peterson and Silberschatz, Addison-Wesley Publishing, Copyright 1985, which is hereby incorporated by reference.

In addition, although it is not shown in the Figures for the sake of clarity, at least one implementation of the present invention includes an end-of-list entry in order dependent list 508. This entry allows allocation of any padding after a last section in a heap (e.g., after c.o in heap 502 (not shown)).

It is important to understand that the present invention maintains the ordering of the segments across the heaps in accordance with order dependent list 508. Thus, as shown in FIG. 14, after segments for the new version of e.o 204 are added to the heaps, all heaps correspond to the ordering: a.o, b.o, e.o, d.o, and c.o. Segments for certain of the files may not be present in some heaps (e.g., the stabstr segment for b.o is not present in heap 506), but the segments in the heaps are never out of order. Although not shown in FIG. 14, a person of ordinary skill in the art will recognize that the newly added segments in heaps 502, 504 and 506 have been filled by incremental linker 108 with data from file e.o 204, necessary for the correct linking of executable file 112.

The present invention further incorporates an article of manufacture, which is a computer-readable medium such as a floppy disk, optical disk, or hard drive, etc. storing computer instructions of a sort executable by a CPU to perform the steps of FIGS. 3 and 4.

In summary, the present invention allows for deletion from and addition to a plurality of heaps, where an ordering of data is maintained across the heaps. A preferred embodiment has been described in which segments are deleted and added to sections (heaps) in an incremental linker software program. The present invention, however, can be used in any circumstances where it is desirable to maintain ordering across heaps where data are added to and/or deleted from the heaps.

In describing the preferred embodiments, a number of specific technologies used to implement the embodiments of various aspects of the invention were identified and related to more general terms in which the invention was described. However, it should be understood that such specificity is not intended to limit the scope of the claimed invention.

What is claimed is:

1. An apparatus for manipulating entries in a plurality of heaps stored in a memory of a data processing system, comprising means for determining respective amounts of free space required in each of the plurality of heaps; and means for allocating the respective amounts of required free space in each of the plurality of heaps, so that an order of entries in the heaps remains ordered across the heaps.

2. The apparatus of claim 1, further comprising:

means for taking the allocated respective amounts of free space from respective free lists stored in the memory and associated with respective ones of the plurality of heaps.

3. The apparatus of claim 1, further comprising:

means for deallocating respective amounts of space, wherein each deallocated amount of space is in a same relative ordering in the plurality of heaps.

4. The apparatus of claim 3, further including:

means for returning the deallocated space to respective free lists stored in the memory and associated with respective ones of the plurality of heaps.

5. An apparatus for manipulating entries in a plurality of heaps stored in a memory of a data processing system, comprising:

means for determining respective amounts of free space required in each of the plurality of heaps;

means for allocating the respective amounts of required free space in each of the plurality of heaps, so that a physical order of entries in the heaps remains ordered across the heaps.

6. A computer program product comprising:

A computer usable medium having computer readable code embodied therein for causing a finding and an ordering of a predetermined amount of free space in each of a plurality of heaps stored in a memory of a data processing system, the method comprising the steps, performed by the data processing system, the computer program product comprising:

computer readable program code devices configured to cause a computer to effect receiving a plurality of predetermined values indicating a respective amount of space to be located in each of a plurality of heaps;

computer readable program code devices configured to cause a computer to effect determining respective locations in the plurality of heaps having each respective amount of space; and computer readable program code devices configured to cause a computer to effect allocating the respective locations, wherein the allocated locations maintain an ordering across the plurality of heaps.

7. A method for finding a predetermined amount of free space in each of a plurality of heaps stored in a memory of a data processing system, the method comprising the steps, performed by the data processing system, of:

establishing a hi pointer and a lo pointer for each of the plurality of heaps, so that each heap has an associated lo pointer and an associated hi pointer;

advancing at least one of the lo pointers to be equal to its corresponding hi pointer, wherein the advancing step includes the sub-step of advancing at least one of the lo pointers corresponding to at least one minimum hi pointer to be equal to its corresponding minimum hi pointer;

advancing at least one of the corresponding hi pointers to point to a next significant segment in the plurality of heaps, wherein the advancing step includes the sub-step of advancing at least one of the corresponding minimum hi pointers to point to a next significant segment in the plurality of heaps;

determining whether the predetermined amount of free space exists in each of the heaps between each associated lo pointer and associated hi pointer; and when the predetermined amount of free space is not found between all of the hi pointers and the lo pointers, keeping an existing value in the lo pointers associated with heaps that do not have a corresponding hi pointer, and keeping an existing value in the corresponding hi pointer that is not a minimum hi pointer.

8. The method of claim 7, further comprising the step of:

when the predetermined amount of free space is found between all of the hi pointers and the lo pointers, adding a segment to at least one of the heaps in the found free space.

9. The method of claim 7, further comprising the step of:

repeating the establishing, advancing and determining steps until the predetermined amount of free space is found or until the associated hi pointers reach the end of their respective heaps.

10. The method of claim 7, further comprising the step of:

advancing at least one of the hi pointers to point to a second significant segment in one of the plurality of heaps, wherein the second significant segment is at a higher location in its heap than the location of a first significant segment in its heap.

11. The method of claim 7, wherein a significant segment is a segment that has an entry pointing to the heap associated with a hi pointer and pointing to at least one other heap.

12. The method of claim 7, wherein free space in each of the plurality of heaps is connected in a linked list.

13. The method of claim 7, wherein the predetermined amount of free space is the same for each heap.

14. The method of claim 7, wherein the predetermined amount of free space is different for each heap.

15. The method of claim 14, wherein the determining step includes the steps of:

checking each block of the free space between an associated lo pointer and associated hi pointer in ordering from largest to smallest; and using the first block of free space that is as large as the predetermined amount of free space.

16. The method of claim 14, wherein the determining step includes the steps of:

checking each block of the free space between an associated lo pointer and associated hi pointer in ordering from largest to smallest; and using the largest block of free space that is as large as the predetermined amount of free space.

17. The method of claim 7, wherein at least two of the plurality of heaps are of different sizes.

18. The method of claim 7, further comprising the step of: receiving a sequence of inputs of the form: "alloc (V)" where "V" is a vector of integers, each representing the amount of space that needs to be allocated in a corresponding heap.

19. The method of claim 18, further comprising the step of:

interspersing the sequence of inputs with commands of "free (i)" where "i" is a sequence number referring to the i'th alloc in the sequence of inputs and meaning that the memory associated with that "alloc" should be freed.

* * * * *